Aug. 16, 1966     H. L. CARPENTER, JR     3,266,390
PLASTIC LINED FIBER CONTAINERS
Filed March 16, 1964     7 Sheets-Sheet 1
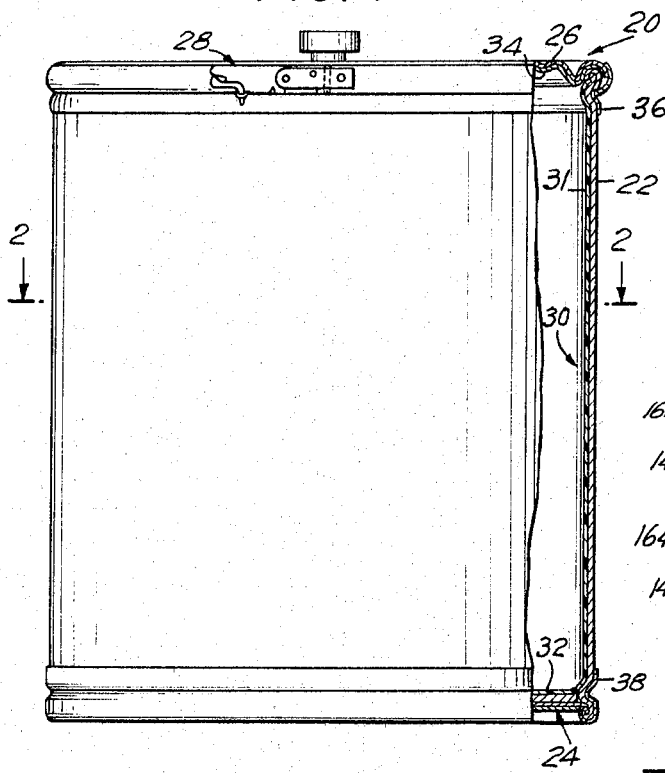
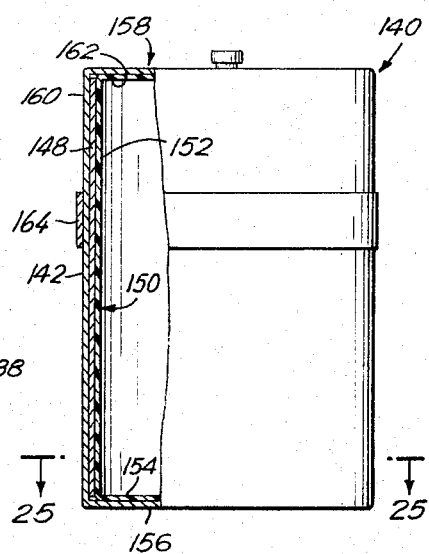
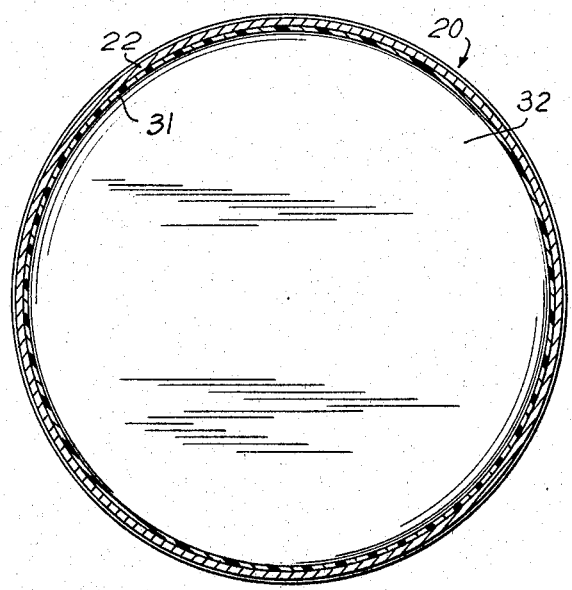
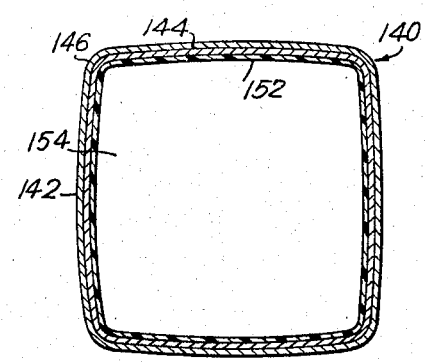
INVENTOR.
HERBERT L. CARPENTER, JR.
BY
Kane, Dalsimer and Kane
ATTORNEYS Aug. 16, 1966 H. L. CARPENTER, JR 3,266,390
PLASTIC LINED FIBER CONTAINERS
Filed March 16, 1964 7 Sheets-Sheet 2
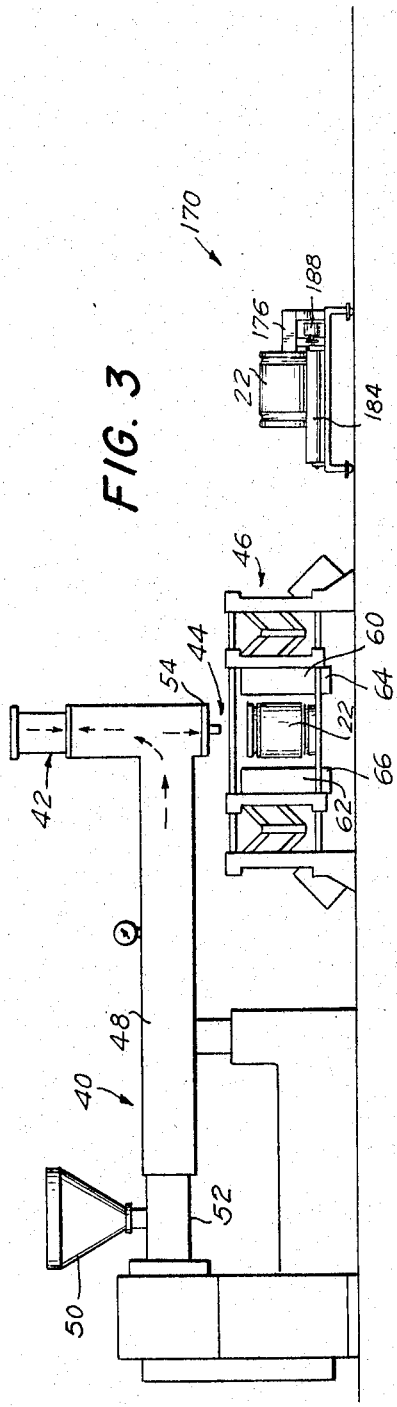
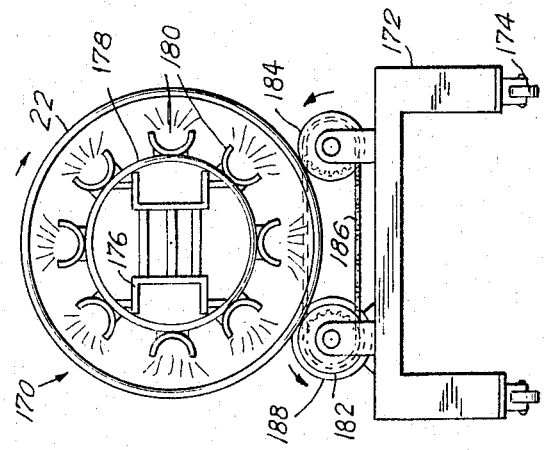
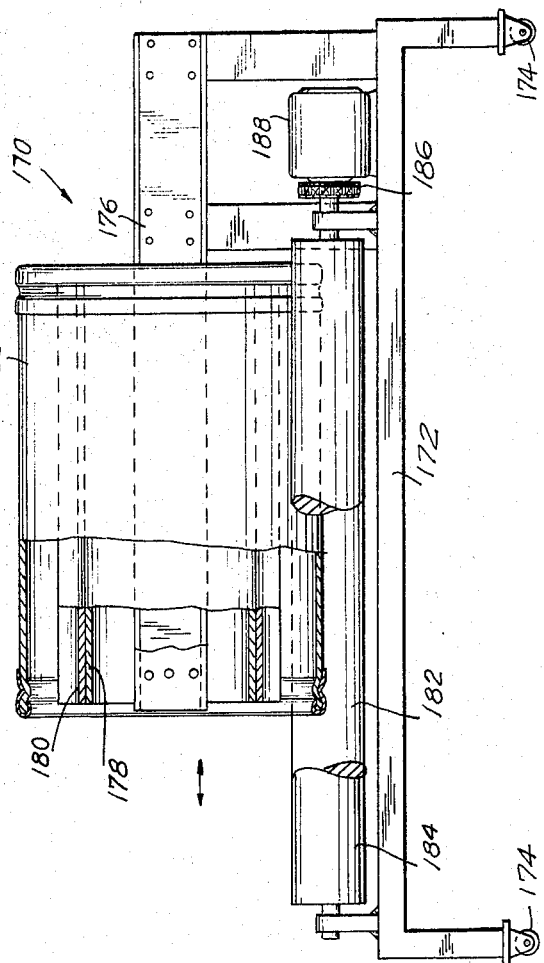
INVENTOR.
HERBERT L. CARPENTER, JR.
BY
Kane, Dalsimer and Kane
ATTORNEYS Aug. 16, 1966     H. L. CARPENTER, JR     3,266,390

PLASTIC LINED FIBER CONTAINERS

Filed March 16, 1964     7 Sheets-Sheet 3

INVENTOR.
HERBERT L. CARPENTER, JR.

BY
Kane, Dalsimer and Kane
ATTORNEYS

Aug. 16, 1966 H. L. CARPENTER, JR 3,266,390
PLASTIC LINED FIBER CONTAINERS
Filed March 16, 1964 7 Sheets-Sheet 4

INVENTOR.
HERBERT L. CARPENTER, JR.

BY
Kane, Dalsimer and Kane
ATTORNEYS

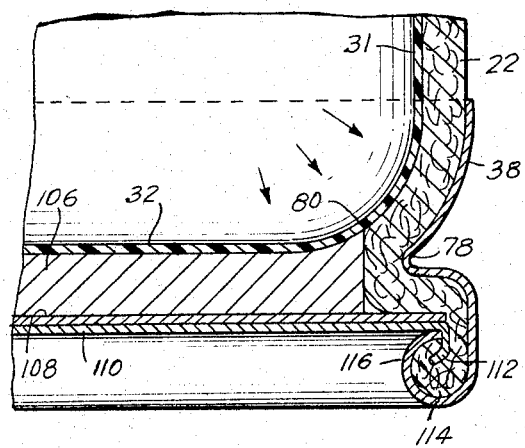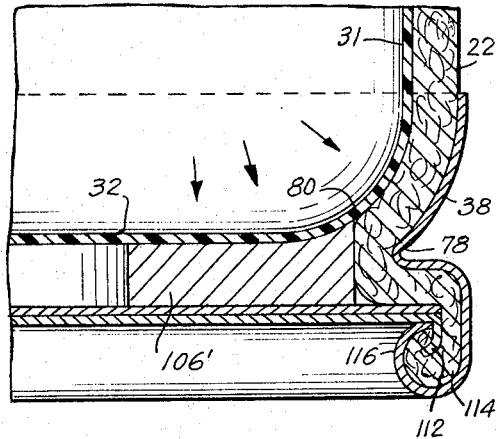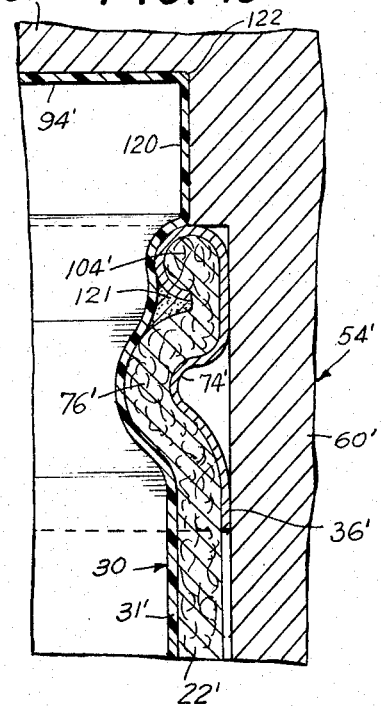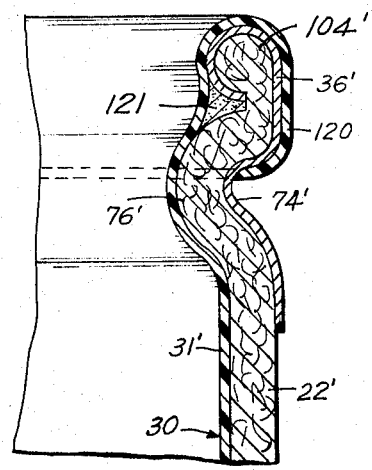

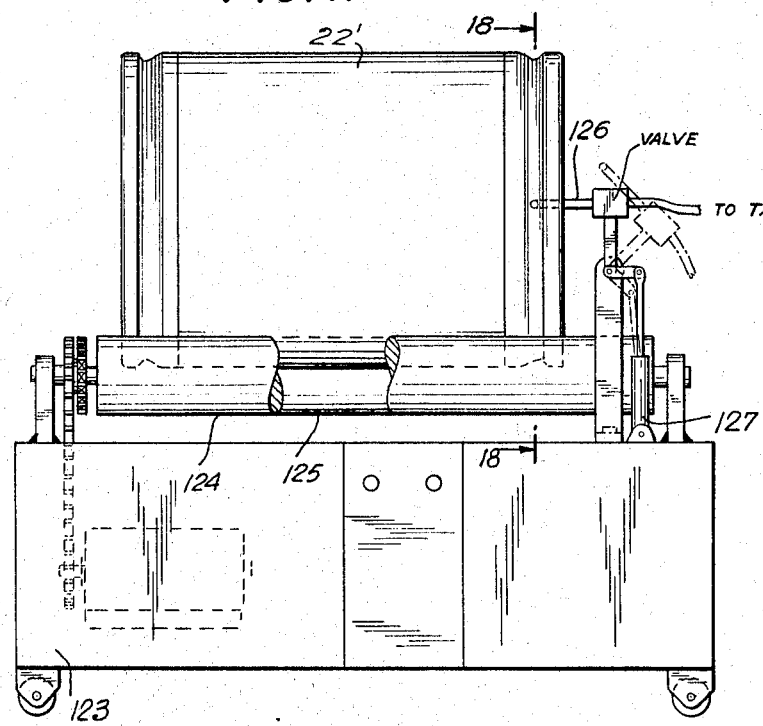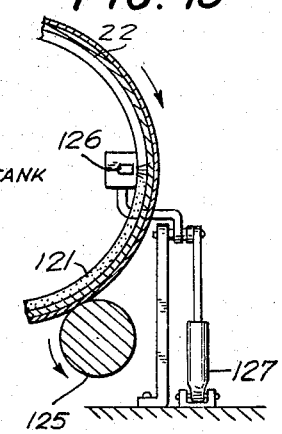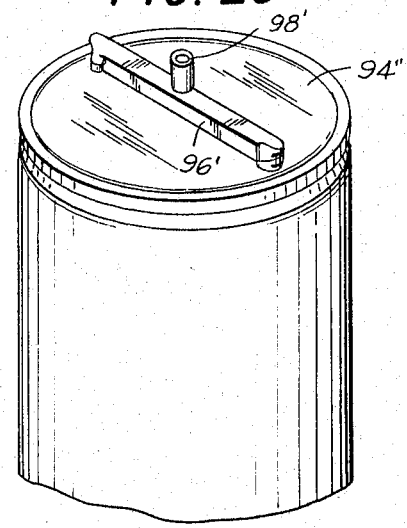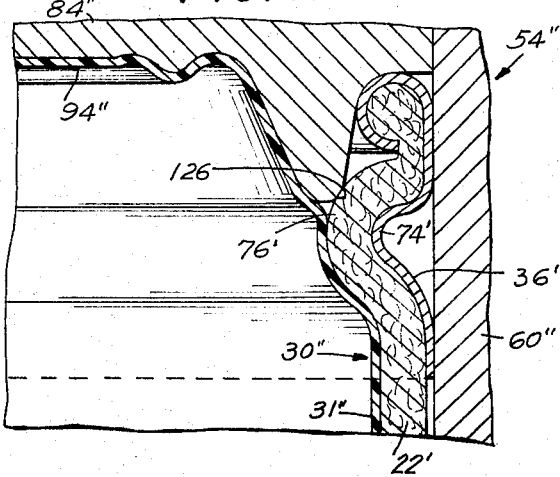

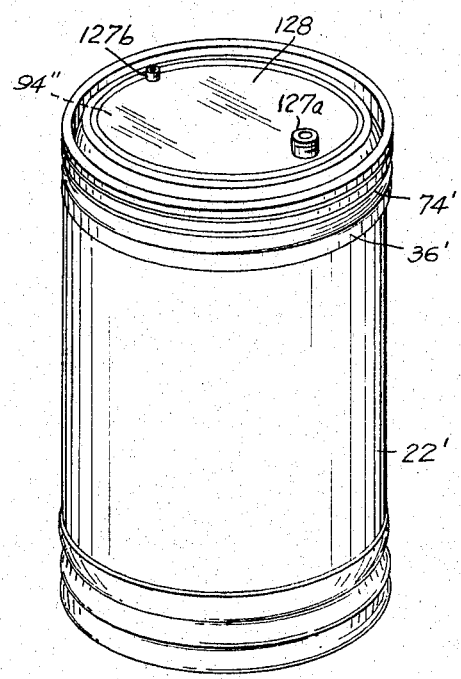
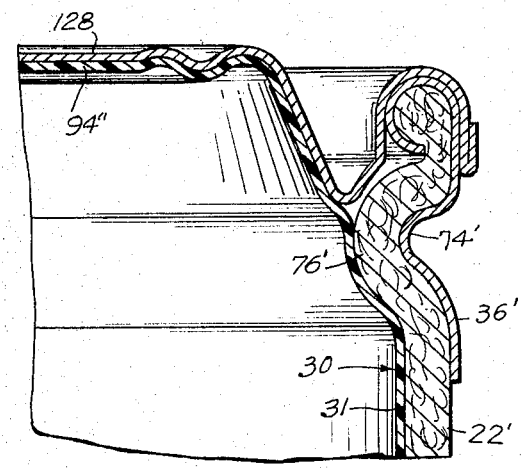
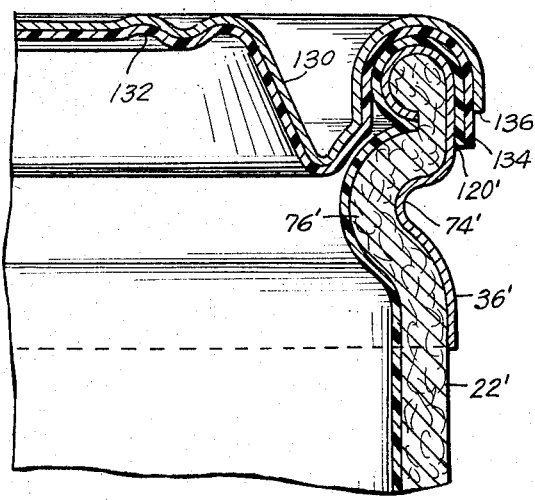

United States Patent Office 3,266,390
Patented August 16, 1966

3,266,390
PLASTIC LINED FIBER CONTAINERS
Herbert L. Carpenter, Jr., Babylon, N.Y., assignor to The Greif Bros. Cooperage Corporation, Delaware, Ohio, a corporation of Delaware
Filed Mar. 16, 1964, Ser. No. 352,066
9 Claims. (Cl. 93—36.01)

This invention relates to improved plastic lined containers, and, more particularly, to improved plastic lined fiber containers as well as their improved method of manufacture whereby liquids and semi-liquids are most effectively stored and shipped therein.

The recent trend in shipping and storing practices for bulk material, of liquid or semi-liquid nature, is to utilize plastic lined fiber drums. Drums of this type are desirable because they are inexpensive and lightweight. The outer shell of the drum is usually constructed of lightweight material such as laminated layers of fibrous material, whereas the inner liner is generally impervious and as such prevents leakage, and/or contamination of the drum contents. The contemplated drums range in size up to 55 gallons or more in capacity and must withstand rough handling in transit by being sturdily constructed and of sufficient structural strength to withstand ordinary use and abuse. Quite naturally, under such circumstances, leakage or contamination of the drum contents through the otherwise impervious liner must be avoided.

It has been found that plastic liners are extremely suitable because of their numerous inherent advantages and characteristics. Among these being flexibility, imperviousness, chemical inertness and tensile strength, as well as others. However, liners now in use are commonly formed with a longitudinal seam; the result of overlapping marginal side-edges of the liner, and a seam created at the juncture of a disc-type base and the side walls of the liner. The presence of these seams produce points of weakness at which the liner ordinarily breaks or tears if it is to fail thereby creating a tendency for the liner to become pervious at the point of rupture. Other types of liners have been proposed in the form of inserts which, in operation, act as a separate entity; and the shell and liner fail to cooperate in resisting loads to the fullest as a composite unit.

An important object of our present invention is to correct the disadvantages of prior art lined drums by eliminating such joints with an improved lined drum and, at the same time, provide satisfactory means for inspecting the bottom and top of plastic liner as well as its side walls prior to closing the top and bottom of the drum.

Another important object is to provide an improved plastic lined fiber drum capable of withstanding ordinary use and abuse during shipping and storage of liquid and semi-liquid bulk materials by blowing a semi-molten plastic parison into engagement with a fiber shell such that there is an opportunity to examine the intended bottom and top of the liner, together with the liner side walls, prior to closing the bottom and top of the drum.

Other objects include provisions for an improved blown plastic lined fiber drum which meets the standards and specifications of the various rules and regulations governing the shipment of liquids and semi-liquid materials in fiber drums as, for example, the standards established by the "Uniform Freight Classification Rule 51," is liquid tight and impervious to contaminating surroundings; is substantially leak-proof, with little or no danger of rupture of the hermetic seal thus provided by the liner, particularly at the bottom chime because of integral one-piece liner construction; is manufactured by employing the fiber shell itself as part of the die cavity; has present a coalescence of the liner material with the fibers of the outer shell to provide a unitary construction; may incorporate one of a number of various top closures depending upon conditions and requirements; and has substantially no weak spots such as crimps, bends and punctures such as that common to prior art plastic lined drums in which the liners were ordinarily supplied from a separate source other than the drum manufacturer thereby increasing the tendency for such failures as a result of packaging and transporting such pre-formed liners to the various manufacturing and assembly sites.

In accordance with the present invention, plastic lined drums are manufactured by initially providing a tubular shell made from laminated layers of fibrous material, open at both of its ends. In accordance with a specific embodiment, reinforcing metal chime strips are exteriorly mounted at both ends of the shell and, as is usual practice, external grooves and internal shoulders are then formed at both ends extending completely around the circumference of the shell, a short distance from the respective peripheral edges. The resultant composite shell structure is then placed in a heater which operates to heat internal surfaces of the shell. Then the heated shell is placed in an open press. A plastic parison is then extruded into the interior of the mounted shell so that the terminal end of the parison extends a short distance beyond the bottom of the shell. The press is then closed in such a manner that the exterior side walls of the shell are adequately confined. Upper faces of the press are actuated at approximately the same time as the lower die faces to close the top of the selected length of parison while retaining an air inlet opening through which an air nozzle may be inserted to communicate with the interior of a length of parison. At such time, the lower end of the parison is pinched or clipped and, substantially simultaneously therewith, the pinching faces of the press are shifted upwardly to locate the base of the retained parison in substantial alignment with the crest of the internal shoulder formed in the lower end of the shell. Air is immediately introduced through the nozzle into the interior of the now sealed parison to blow the parison outwardly and expand it into engagement with the interior walls of the shell, and against the upper and lower die faces. Improved air evacuation means may provide access for the air confined between the exterior of the parison and shell and internal press faces to prevent any irregularities in the ultimately blown liner. Suitable cooling means in the dies permit immediate setting of the blown plastic liner so that the shell, with its liner, can be removed from the press within a minimum period of time. The top and base of the liner may now be examined for undesirable weak spots, pin holes or other potential points of rupture. If a sufficiently sound top and base of the liner is found, which is usually the case when practicing our invention, the selected top and bottom closures for the lined fiber drum are fabricated in accordance with the usual techniques employed in the trade. With respect to the drum top, it will become evident that one of a number of closures can be utilized depending upon the intended application of the finished drum. A specific and improved top closure will be discussed fully below. With respect to the bottom closure, provisions are introduced whereby sharp corners at the junction between the bottom closure and side walls of the shell are eliminated thereby optimizing the durability of the liner and its ability to function in accordance with specifications.

Other objects and advantages become more apparent from the detailed description of the invention which is to be taken in conjunction with the drawings showing a somewhat preferred embodiment thereof and in which:

FIG. 1 is an elevation view with certain parts broken away and removed of a plastic lined fiber drum fabricated in accordance with the present invention and having a cover secured in place by means of a locking rim assembly, and a central filler and emptying aperture and cap therefor;

FIG. 2 is a cross sectional view of the drum taken along the line 2—2 of FIG. 1;

Figure 6:
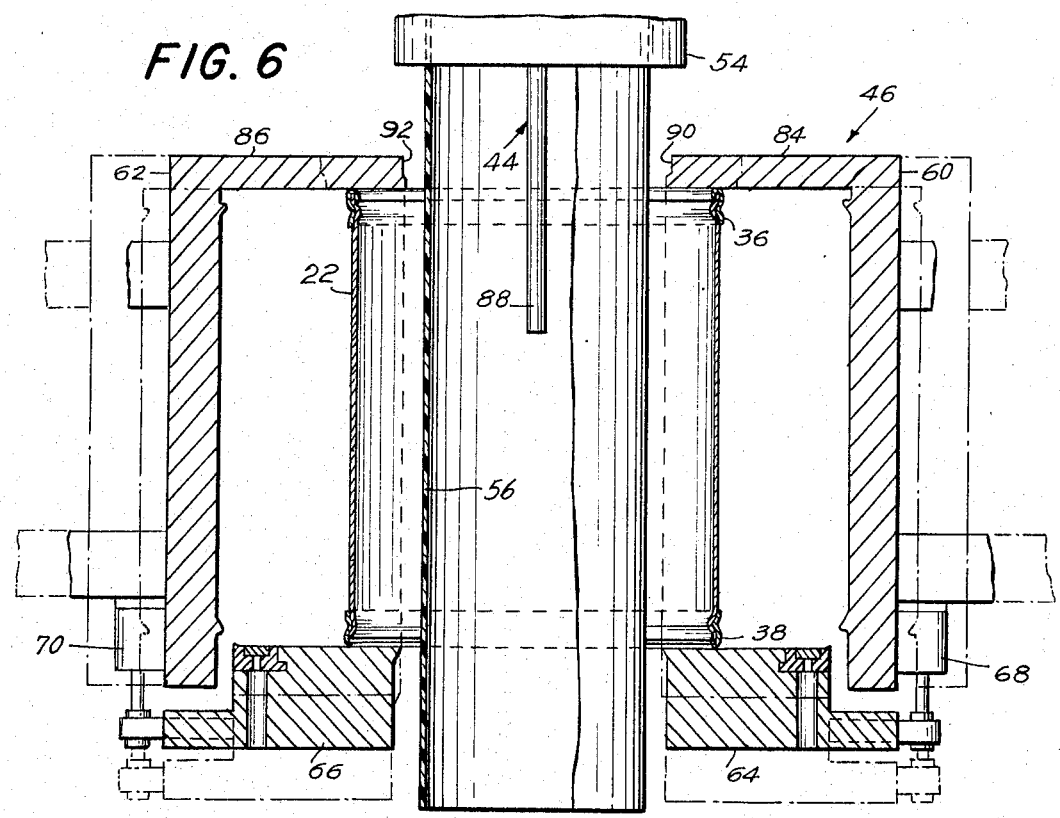
Figure 8:
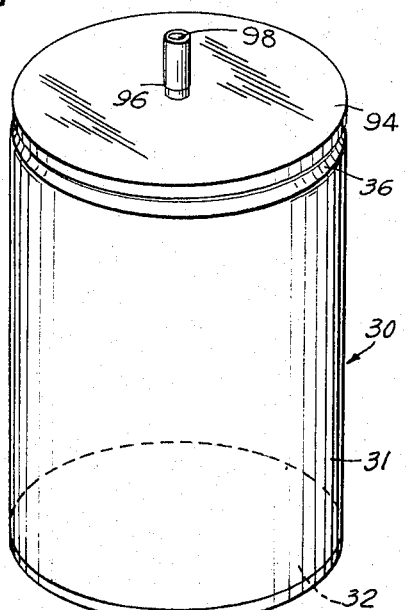
Figure 7:
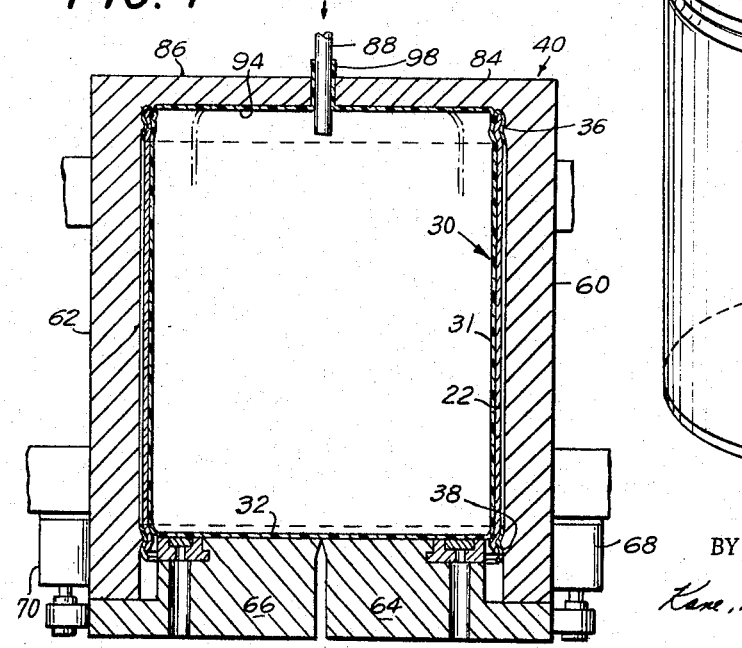
Figure 9:
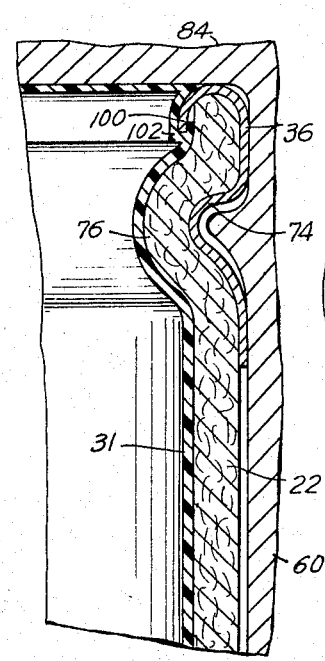
Figure 11:
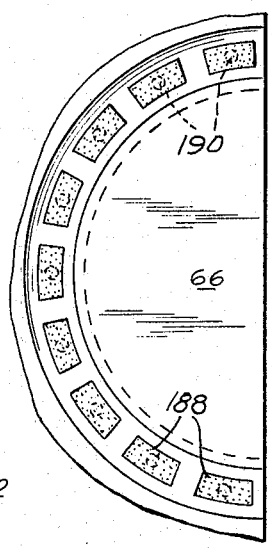
Figure 10:
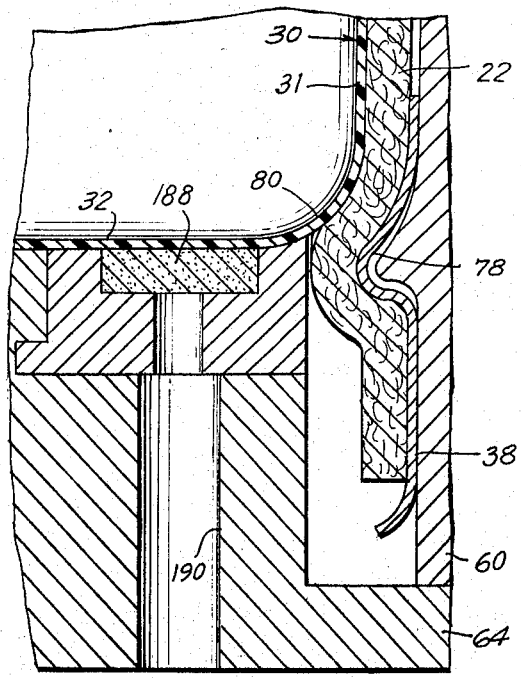
Figure 12:
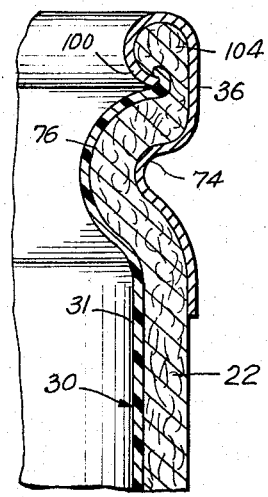

FIG. 3 is a schematic diagrammatic view of an extruder having at its discharge end and accumulator and nozzle from which a plastic parison is discharged into the drum to be lined which is suitably mounted in the press with an accompanying heating station being shown whereby a shell prior to being placed in the press has its internal surfaces heated for purposes of increasing the affinity and permeation of the plastic of the liner into the fibers of the shell during the blow molding cycle;

FIG. 4 is an enlarged elevational view showing a liner suitably supported on the support of the heating apparatus such that the heating elements are disposed interiorly of the shell;

FIG. 5 is an end elevational view thereof showing the placement of the heating elements and the manner in which the shell is rotated during the heating step;

FIG. 6 is an enlarged schematic and diagrammatic sectional view of the press showing the movable die faces which cooperate in confining the outer fiber shell, with dies at each end thereof for effectively blow-molding the extruded parison within the shell;

FIG. 7 is a similar sectional view with the die faces closed and the lower terminal end of the parison closed thereby and the upper end of the length of extruded tubing severed from the remainder of the parison so that the liner may then be blown to assume the position illustrated in solid lines from its initial position as represented in phantom;

FIG. 8 is a perspective view of the blown liner segregated from the press and confining outer fiber shell;

FIG. 9 is an enlarged fragmentary sectional view of the top of the fiber shell and blown plastic lining, while still in the closed press;

FIG. 10 is similarly an enlarged fragmentary sectional view of the bottom of the fiber shell and blown plastic lining with the press in a closed position showing the means by which the interior of the press and particularly the shell is evacuated incident to the expansion of the liner during the blowing cycle;

FIG. 11 is a fragmentary plan view of the lower die face of the press showing the disposition of sintered plugs for facilitating the passage of air therethrough while, at the same time, not affecting the desired ultimate configuration of the base of the blown liner;

FIG. 12 is an enlarged fragmentary sectional view of the top of the finished lined drum having a metallic chime strip embracing a bead at the upper end of the shell and interlocked with the upper end of the liner;

FIG. 13 is an enlarged fragmentary sectional view of the finished base of the drum having a metallic chime strip embracing a bead at the lower end of the shell which cooperates in anchoring the bottom closure together with a cushioning layer of the drum juxtapositioned with the base of the blown plastic liner;

FIG. 14 is a similar enlarged fragmentary sectional view of a further embodiment of a finished base of the drum wherein an annular ring replaces the cushioning layer;

FIG. 15 is a fragmentary sectional view of a modification of the upper end of a finished drum while still in the press showing an upstanding plastic flange and a disposition of the blown liner in relationship to a prepressed upper bead and embracing metallic chime strip together with a strip of caulking between the fiber of the shell and liner;

FIG. 16 is a fragmentary sectional view of the drum illustrated in FIG. 11 showing the trimming of the upper zone of the liner and folding the remaining liner strip over the outer face of the prepressed metallic chime strip which takes place while the resin of the liner is still warm which, when cooled, will shrink tightly around the exterior surface of the chime strip and into the external groove;

FIG. 17 is an elevational view of a shell prior to placement in the blow-molding press being subjected to a caulking operation in applying the caulking strip of FIGS. 15 and 16;

FIG. 18 is a fragmentary end elevational view partly in section showing this caulking applying apparatus;

FIG. 19 is a fragmentary sectional view of a still further modification in the fabrication of the upper liner section such that, upon blowing, the section will assume the configuration of a cover to be eventually employed for closing the upper end of the finished drum and be formed as an integral continuation of the liner and, at the same time, have filler and vent openings and fittings;

FIG. 20 is a fragmentary perspective view of the head of the liner section showing the manifold having air conduits and which is severable to provide the filling and vent fittings;

FIG. 21 is a fragmentary sectional view of this modified top closure with the finished fiber drum removed from the press showing the meshing relationship between the cover and the adjacent sectors of the blown plastic liner with the cover having suitable openings to receive the filler and vent openings and fittings of the plastic liner;

FIG. 22 is a perspective view of a lined fiber drum of this invention showing filler and vent openings projecting through a metal cover;

FIG. 23 is still another fragmentary sectional view of further top closure in which the liner for the side walls of the fiber shell is formed similarly to that depicted in FIG. 16 with the upper sector of the liner being wrapped around a prepressed metallic chime strip and cooperating with a preformed plastic cover seal associated with a conforming cover with the two plastic members being heat sealed at their terminal edges;

FIG. 24 is a side elevational view with certain parts broken away and removed of another form of fiber drum having a blown plastic liner in accordance with the present invention, with the closure bearing a central filler and emptying aperture and cap therefor; and FIG. 25 is a cross sectional view taken along the line 25—25 of FIG. 24 showing the drum as having transversely convex sides joined together by rounded corners.

In the accompanying drawings, with particular reference to FIGS. 1 and 2, a fiber drum 20, fabricated in accordance with the present invention, is shown as having a tubular shell 22 which may be of any cross-sectional shape and which is preferably made from convolutely wound laminated layers of fibrous material such as kraft board, fiber board or the like. The fiber shell 22 is usually made by winding a sheet of kraft board around a mandrel with suitable adhesives coating the surfaces of the board and permeating the pores and fibers thereof.

The bottom end of the shell 22 is provided with a permanently attached closure 24 and the upper end with a removable cover 26 constituting one of a number of upper closures that may be incorporated along with the drum. The illustrated cover may be of the conventional steel variety which is ordinarily releasably locked in place by means of a locking rim assembly 28 which may be of the type disclosed in commonly assigned United States Patent No. 2,884,176 granted April 28, 1959, and United States Patent No. 2,966,378 granted December 27, 1960.

The interior of the shell 22 is lined with a blown plastic liner 30 having corresponding side walls 31 extending into an integral base 32 resting on the bottom closure 24. Thus, it should be abundantly clear that the liner does not contain a joint and, consequently, a zone of weakness adjacent the bottom of the drum. In order to complete the seal for the interior of the drum in accordance with the illustrated embodiment, the cover 26 may be provided with a pre-formed cover seal 34 also fabricated from a suitable resinous material. As illustrated, a centrally located filling and emptying screw fitting and cap projects from the closure.

The end portions of the drum 20 may be strengthened in the usual manner by providing upper and lower metal reinforcing chimes 36 and 38 around both the upper and lower ends, respectively, of the shell 22.

The liner 31 is, preferably, blown from extruded thermoplastic material having the desired characteristic governed by the intended use of the finished drum 20 and the nature of the liquid or semi-liquid substance to be contained therein. Among the numerous advantageous characteristics of the liner 31 that will be considered in this regard will be substantial imperviousness, chemical inertness, tensile strength, non-toxicity and other detrimental effects on contained substances which may include chemicals, combustibles, comestibles or food products. These thermoplastic materials may include polyethylene, polypropylene, nylon and the like, to mention a few.

In FIG. 3, we have illustrated, rather schematically, apparatus by which a suitable length of the selected thermoplastic material, extruded in tubular form, may be blown into corresponding engagement with the contours of the shell 22. This apparatus includes an extruder 40 having a built-in accumulator 42, separately tapped or built-in blowing equipment 44 and a press 46.

The extruder 40 includes an extruding screw (not shown) within the tubular housing 48. A hopper 50 conveniently receives the thermoplastic material either in granular or pellet form and is adapted to transfer this material into the melter 52 at the inner end of the tube 48. This hot melt material will then be placed in condition for transmission to the other terminal or free end of the tube by the extrusion screw contained therein. In order to speed up the operation of the lining of the fiber shell 22 and maintain the extruder continuously operating, an accumulator 42 is mounted at the terminal end of the tube 48 and is adapted to store the molten material transmitted by the extrusion screw. Although an accumulator is not necessary, it lends itself to more efficient extrusion by decreasing extrusion time for a length of parison, approximately ten-fold and even higher, depending on the parameters of the apparatus.

The lower end of the accumulator 42 includes a ring nozzle 54 of the adjustable type. This nozzle forms the tubular parison 56 as the molten thermoplastic material is discharged therethrough from the accumulator. The adjustment of the ring nozzle 54 takes into consideration two factors, namely, the diameter of the parison 56 as well as its thickness. The extruded parison is continuously formed and discharged downwardly by means of the ring nozzle 54. A double platen hydraulic press 46 is disposed beneath the nozzle 54, and when in an open condition, permits free passage therethrough the parison 56. As will be more fully explored shortly, upon closure of the press 46, a predetermined length of the parison 56 will be severed from that discharged through the nozzle 54 to form the blank ultimately blown into engagement with the side walls of the fiber shell 22 to provide the desired liner.

A successful commercial application of my invention includes a Luigi Bandera extruder with built-in accumulator, manufactured by the Meccaniche Luigi Bandera firm of Italy and distributed in the United States by The Rainville Company, Inc., Garden City, New York; blowing equipment manufactured by the Blow-O-Matic Corp. Ltd., whose sales agent is Danish Plastic, Copenhagen, Denmark; and a double hydraulic platen press sold under the name of Rainco Molder distributed by The Rainville Company, Inc., Garden City, New York.

Although the blowing equipment 44 is shown herein associated with the discharge end of the accumulator 42, it should be understood that this equipment may be located at the base of the press 46 so as to introduce air into the parison 56 through the bottom end thereof as is frequently done in commercial blowing operations.

In accordance with this invention, the shell 22 is, preferably, preheated to a predetermined level prior to placement in the press 46 so as to cause the plastic of the side walls 31 of the liner to properly bond or adhere throughout to the interior of the shell 22. In this connection, the interior of the shell 22 should be hot enough to facilitate this desired bonding action while, at the same time, not be too hot which may, in certain instances, cause bubbling in the liner. It has been found that the temperature on the interior surface of the shell should range between 110° F. to 150° F. for satisfactory and optimum results.

Thus, the shell 22 prior to placement in the press 46 is exposed to a heating station which, preferably, includes the heating mechanism 170. As will be appreciated from FIGS. 4 and 5, this heating mechanism 170 includes a support 172 which may be mounted on a suitable number of rollers 174 for placement at the desired location relative to the press 46. A standard 176 constitutes part of the support and mounts cylinder 178. Projecting radially from the stationary cylinder 178 are a plurality of longitudinally extending electrical heater elements 180 each of which may be of a suitable electrical variety and include reflective surfaces for applying the heat to the interior of the shell 22 subjected to the heater station. The shell 22 desired to be heated is supported by a pair of rollers 182 and 184 suitably journaled in upstanding brackets of the support 172. These rollers 182 and 184 may be coupled to one another by means of a sprocket chain 186 extending over sprocket wheels associated with each roll. Each of the rolls 182 and 184 are constantly rotated by means of a motor 188 the output of which is taken up directly by the roll 182 and transferred to roll 184 by means of a sprocket chain 186. When a shell 22 is mounted on these rolls 182 and 184 and, at the same time, disposed about the heating elements 180, as shown in FIG. 5, the shell will be revolved relative to the heaters to assure a uniform application of heat to its internal surfaces. The double ended arrow in FIG. 4 illustrates the manner in which a shell is exposed to the heating elements and then removed therefrom. The rolls 182 and 184 have been rotated at approximately 20 r.p.m. in successful applications of this invention. In addition, a gear motor drive was utilized having one-sixth H.P. with eight heating elements 180 employed each having a rating of 1,800 watts and each being infra-red heaters. In actual practice under these conditions, the shells 22 remained in the heating mechanism 174 approximately 45 to 60 seconds.

Referring now to FIGS. 6 and 7 in particular, it will be noted that the press 46 includes a pair of opposed drum dies 60 and 62 each of which are adapted to be hydraulically actuated from the open position illustrated in FIG. 6 to the closed position of FIG. 7. In addition, the press includes a pair of bottom dies 64 and 66 which are adapted to shift upwardly from their lower position of FIG. 6 to their elevated position of FIG. 7 through the operation of the respective hydraulic piston and cylinder assemblies 68 and 70. Substantially simultaneously with the raising of these bottom dies, the drum dies 60 and 62 serve to force the bottom dies 64 and 66 inwardly to the position illustrated in FIG. 7.

As stated in the foregoing, my present invention contemplates the examination of the tops and bottoms of the plastic liner 32 in order to be assured of its continuity and freedom from any zones of weakness, pin holes or the like. To this end, in forming the chime reinforced drums 20, the chime strips 36 and 38 are initially placed around the fiber shell 22 prior to the blowing cycle. In this connection, the upper chime strip 36 is initially fitted tightly around the shell 22 and extends from a spaced distance below the upper end upwardly and overlaps the top and, at the same time, projects downwardly for a short distance into the interior of the shell as shown most clearly in FIG. 9. A short distance from the upper end of the shell 22 the fiber body and the metal reinforcing chime 36 are deformed inwardly so as to provide an external groove 74 and internal shoulder 76.

Similarly, the bottom reinforcing chime 38 is initially placed tightly around the lower end of the shell 22, but merely overlaps the bottom peripheral edge thereof. The bottom chime strip 38 and fiber body are then deformed to provide the external groove 78 and internal shoulder 80. The foregoing association of the chime strips 36 and 38, with the fiber shell 22, is more fully disclosed in my prior Patent No. 2,884,176 granted April 28, 1959.

The die cavity provided by the drum dies 60 and 62, as well as the bottom dies 64 and 66, are correspondingly contoured for neatly receiving the external grooves and internal shoulders formed in the fiber shell 22 and the reinforcing chimes 36 and 38. The upper circumferentially extending peripheral edge of the bottom dies 64 and 66 are curved upwardly as shown for purposes of providing a slight radius of curvature to the periphery of the base 32 of the liner 30 (see FIGS. 6, 7 and 10).

Suitable air and vapor exhaust ports may be provided in the dies of the press between the die cavities and the external face of the fiber shell 22, as well as between the inner face of the fiber shell 22 and the exterior of the liner 30, for purposes of eliminating undesirable air or vapor pockets when the die faces are closed, and the sealed length of parison blown to its expanded condition. In this connection, a series of porous steel or sintered metal plugs 188 constitute part of the bottom dies 64 and 66 to faciliate the venting of air. In addition, these bottom dies 64 and 66 are provided with air passageways 190 immediately below each sintered plug 188 for the vented air. The plugs, naturally, should be sufficiently strong to withstand the pressures created or generated during the closing of the die faces and molding of the liner 30. Consequently, porous sintered steel has proven to be the satisfactory material from which to fabricate the plugs.

The fiber shell 22 with its tightly fitting upper and lower reinforcing chimes 36 and 38 is mounted in the fully opened platen press 46 either manually or automatically by suitable conveying and feeding means. Subsequent to the discharge of a predetermined length of molten thermoplastic parison 56 which is preferably in tubular form having in the present embodiment a substantially circular cross-section, die press 46 is closed. The top die sections 84 and 86 of the respective drum side wall dies 60 and 62 are, accordingly, shifted towards one another to pinch the plastic parison 56 and, at the same time, provide access therethrough at their juncture for an air blowing tube 88 of the employed blowing equipment 44. It should be fully understood at this time that the juncture of the top die sections 84 and 86 may also include mechanism for forming one or more bung holes. Under these circumstances, the faces 90 and 92 of the upper die sections 84 and 86, respectively, may in themselves be employed as die cavities.

Upon the closing of the upper die sections 84 and 86, it naturally follows that the drum side wall dies 60 and 62 will embrace the exterior of the fiber shell 22.

Substantially simultaneously with the operation, the bottom dies 64 and 66 will close by traveling radially inwardly along with the drum side wall dies 60 and 62 to pinch and, at the same time, seal the parison 56 a short distance above its lower terminal end. Immediately thereafter, the hydraulic piston and cylinder assembly 68 and 70 will elevate the bottom die sections 64 and 66 as a unit into the fiber shell 22 against the internal lower shoulder 80 while carrying therewith the associated sections of the parison 56.

In order to minimize wrinkling or crimping, and, consequently, the creation of zones of weakness in the pinched length parison 56, air under pressure may be introduced to the interior of the parison through the air pipe 88 as the press 46 closes. This introduction of air under pressure can, quite obviously, be automatically initiated through the actuation of suitable switching means. The pinched length of parison, while still in a somewhat molten condition, will be blown and, consequently, expanded into engagement with the cavities provided by the dies faces of the press 46, as illustrated in FIG. 7. Thus, a liner 31 is formed having an upper liner section 94 conforming with the internal face of the upper die sections 84 and 86 and a liner base conforming with the inner face of the bottom dies 64 and 66. Liner side walls 31 follow the contours of the fiber shell 22 starting from a location substantially opposed to the crest of the lower internal shoulder 80 to the upper edges of the upper chime strip 36.

In order to expedite the cooling and setting of the blown thermoplastic material, the die faces of the press 46 are water cooled in accordance with usual practice or refrigerated in a known manner. The press 46 is then opened to retract its die faces and permit the withdrawal or removal of the lined fiber shell 22. The approximate configuration of the blown liner is illustrated in FIG. 8 as it would appear disassociated from the surrounding shell. As will be noted, a manifold 96 extends upwardly from the exterior of the upper liner section 94 and may be easily removed by any trimming or severing operation. The configuration of the manifold 96 results from the construction of the die faces 90 and 92; and that in this connection may provide, in addition to the opening 98 created by the air pipe 88, an externally threaded filling and emptying fitting shown on the present embodiment for illustrative purposes only. In this connection, if the top liner section 94 is to be retained to conform to the selected closure, the fitting would project therethrough and conveniently receive an internally threaded cap in a manner which will become evident incident to the teachings of the embodiment shown in FIGS. 19 and 21.

Another fiber shell 22, with upper and lower chime strips 36 and 38, as illustrated in FIG. 6, may be placed in the open press 46 to initiate another cycle by which a blown plastic liner is produced in accordance with the foregoing manufacturing steps. It should be understood that the timing of the cycle and sequence of operation permit the insertion and withdrawal of the fiber shell 22, efficient closing and opening of the press 46 and, at the same time, continuous extrusion of the parison 56.

In accordance with a commercial application of the invention, the press 46 was preset to exert pressures upwardly of 20 tons. The thermoplastic parison was extruded at temperatures of about 350° F., while the extruder 40 induced pressures on the hot melt between 3000 to 5000 p.s.i. The thickness of the lines were controlled and ranged between 20 mils and 30 mils.

With respect to the parameters of the parison, it should be realized initially that the selected thermoplastic material should be capable of being blown. The molecular structure of the plastic will naturally determine the amount of stretching of the parison incident to blowing. In expanding the parison into the desired liner, the elastic limit of the material should not be exceeded, bearing in mind that the air pressure acts uniformly on and normal to the liner walls and that certain sections of the liner will be expanded more than others because of the contours of the die cavities of the press. The thickness of the extruded parison should be small enough to permit expansion and large enough to avoid creation of zones of weakness in the blown liner. Naturally, the diameter of the extruded parison must take into consideration the thickness thereof and vice versa in order to obtain the desired liner; and these two parameters will, in effect, balance one another and become readily calculable within a short period of time after practicing our invention. Under the circumstances, the thickness of the plastic liner can be varied according to the requirements.

I have found that, due to the molten condition of the parison as it is blown, the thermoplastic material permeates and penetrates the kraft of the shell; and there is noticeable adherence between the liner and the shell. The process can be regulated whereby the degree of adhesion between the liner and shell can be controlled to best suit the requirements for which the package is made. As previously explained, optimum adherence between the liner side walls and the shell is realized on exposure of the interior surfaces of the shell to the heating station employing the heating mechanism 170. Variables that should also be considered are the temperature and pressure at which the liner is blown and the length of time in which the pressure is exerted. The thermoplastic material utilized and the condition of the kraft including its moisture content are other determining factors. It should be understood the method of application can be such that the thermoplastic liner can be blown to the contour of the interior of the shell and not be secured thereto.

As will be appreciated by those skilled in the art, the upper liner section 94 and liner base 32 may now be examined for continuity, zones of weakness, pin holes and the like. At the same time, the integral juncture of the side walls 30 therewith may also be examined for any possible ruptures.

The top chime construction may now be completed. As stated in the foregoing, the upper chime strip 36 includes a downturned inner peripheral edge designated by numeral 100, which in the embodiment heretofore disclosed, is slightly spaced from associated surfaces of the upper end of the fiber shell 22. Accordingly, when the liner 31 is blown, thermoplastic material will be forced into the existing crevice between the chime and inner face of the shell as illustrated in FIG. 9. The upper liner section 94 may now be removed by trimming, either manually or automatically, radially inwardly from the inner peripheral end of the upper chime strip 36 along the zone 102.

A rounded bead 104 is then formed and with the same operation the inner periphery 100 of the upper chime strip 36 is curved downwardly and inwardly so as to encase and protect the bead 104. As will be clearly observed in FIG. 12, the upper end of the liner side wall 30 embraces the inner peripheral edge 100 of the chime strip and, at the same time, is embedded in the bead to provide an effective seal and prevent undesirable penetration of the contents of the ultimately formed fiber drum 20 through the fibrous side walls at this juncture. For details and acceptable technique for completed top chime construction, reference is made to my United States Patent No. 2,884,176 granted April 28, 1959.

The bottom reinforcing chime construction may similarly be completed in accordance with the teachings of our patent mentioned immediately above. Thus, a cushioning bottom spacer 106 may be placed against the outer face of the liner base 32 and in engagement with the internal shoulder 80. An inner reinforcing fiber layer 108 may then be placed against the outer face of the spacer 106 and, in turn, may be covered by an outer fiber layer 110 of somewhat increased diameter having a laterally extending apron 112. The finished bottom chime construction will include the bead 114, encased and protected by the inner peripheral edge 116 of the bottom chime 38, which is pressed so as to be curved upwardly and inwardly. As illustrated, the inner and outer layers 108 and 110 will be firmly retained between the inner peripheral edge 116 of the bottom chime strip 38 and the internal shoulder 80 of the fiber shell 22. The apron 112 of the outer layer 110 will be interlocked within the bead 114 as shown in FIG. 13. The spacer, on the other hand, will be forced upwardly into tight engagement with surfaces of the internal shoulder 80.

As will be appreciated from FIG. 13, the cushioning layer 106 is provided with a circumferentially extending peripheral curved upper face which conforms to the curvature of the liner formed at the junction between the liner base 32 and side wall 31, thus, sharp corners at this critical point or location is eliminated. In FIG. 14, another form of cushioning layer 106′ is illustrated and is in the form of a circular ring having its outward and upper face curved to correspond with the associated surfaces of the liner 30. This cushioning liner 106 and 106′ may be formed from molded material and, more particularly, may be formed from corrugated board, foam plastic such as styrafoam and the like. The cushioning liner supports the plastic lining and cushions against shocks and, as explained, may assume the form of a full disc or ring.

In FIGS. 15 and 16, I disclose another form of top closure for the contemplated plastic lined fiber drums. In this embodiment, the top chime construction is completed prior to the introduction of the fiber shell 22′ into the open press 54′. In this connection, reference should be made to my United States Patent No. 2,884,176 granted April 28, 1959 for further details of the chime formation. The drum side wall die as depicted by die 60′ is extended beyond the uppermost edge of the chime strip 36′ such that when the liner 31′ is blown, a liner strip 120 is thereby formed. The liner 31′ is then trimmed at the juncture 122 of the liner strip 120 and the top liner section 94′ following the opening of the die faces of the press 54′ and removal of the fiber shell 22′ with contained liner 31′. While warm, the trimmed strip 120 is then folded over the top chime strip 36′, as illustrated in FIG. 16 such that the terminal end of this strip is disposed in the internal groove 74′ and shrinks into this groove in conforming relationship therewith. Thus, a protective liner is not only provided for the fibrous material at the upper end of the shell 22′, but also for portions of the chime strip 36′ that may come into contact with the contents of the finished drum.

In order to assure substantially uniform wall thickness of liner 30 particularly at the juncture of the beads 76′ and 104′ where the blown plastic material would otherwise have a tendency to thin out to cover the entire inner surfaces of the shell, a caulking material 121 is applied where shown. This application may be performed by hand or in accordance with an automatic technique to be described. The caulking material 121 is preferably flexible and may assume the form of a compound having putty-like consistency or may be in strip form. In this connection, any suitable commercially available compound may be utilized and successful results have been realized through the use of commercially available Polyseamseal.

In FIGS. 17 and 18, an exemplary apparatus is illustrated for applying caulking compound to the internal junction between the bead 76′ and 104′. Essentially, this apparatus includes a portable table or support conveniently mounting a pair of parallel and spaced motor driven rolls 124 and 125 similar in construction and manner of being driven as rollers 182 and 184 shown and discussed in connection with FIGS. 4 and 5. Also mounted on the table 123 is an automatic valve controlled nozzle 126. In addition, a unit 127 is mounted by a support 123 and is coupled at its upper end suitably to the lower supporting end of the nozzle 126 in the form of a crank mechanism. The unit 127 may be a piston cylinder arrangement or a solenoid with solenoid arm and functions to raise the nozzle 126 to an incline position, as shown in dotted lines in FIG. 17, to a lower substantially horizontal position as shown in full solid lines in this figure. In the latter position, the nozzle is in a position to apply caulking compound to the location desired. The emission of the caulking compound is regulated by means of the valve which is interposed between the nozzle 126 and a supply line leading to a supply tank or other suitable source of the caulking material fed to the nozzle under pressure in accordance with conventional practice. Obviously, an attendant for the apparatus of FIG. 17 and FIG. 18 can regulate the sequence of events and perform the desired cycle of operation. This would entail the placement of the shell 22' on the support rollers 124 and 125 and then the lowering of the nozzle 126. The caulking compound is extruded from the nozzle 126 and continues to do so until the shell 22' has cycled through one revolution. The nozzle 126 is retracted and the shell 22' is removed. Naturally, the sequence of events can be automatic and governed by a timer; thus, a timer or programmer for example, can cause the automatic lowering of the nozzle 126 by energizing or otherwise actuating the nozzle actuating unit 127 following the placement of the drum 22' on the supporting rollers 124 and 125. The automatic valve for controlling the extruding of the caulking compound through the nozzle 126 may now be actuated simultaneously with the actuation of the motor and drive for the supporting rollers 124 and 125. Under these circumstances, the shell 22' will initiate its single revolution as the caulking material is extruded through the nozzle 126. The timer or programmer will then operate to close the valve of the nozzle 126 upon completion of one revolution of the shell 22' and, at the same time, stop further rotation of the shell by de-energizing the drive of the rollers 124 and 125. Immediately thereafter, the actuating unit 127 will operate to lift the nozzle 126 away from the shell 22' at which time the shell may be removed and placed in the press 46. The programming of the foregoing events is readily accomplished and ascertained in view of the controllable nature of the rate of rotation of the shell 22'.

Referring now ot FIGS. 19 and 22, a still further top closure is contemplated for our plastic lined fiber drum. In this embodiment, the top chime construction is also completed prior to the insertion of the shell 22' into the press 54". The press, however, will be provided with an upper die section as represented by section 84" having a configuration corresponding with that of the cover to be placed over the upper open end of the drum. In addition, the upper die face 84" will cooperate with the drum side wall die 60" in order to accommodate upper portions of the chime strip 36' so that a downwardly projecting peripheral edge 126 will engage the internal shoulder 76' of the fiber shell 22' upon closure of the press 54". When the liner 31" is blown, it will assume the configuration or shape illustrated in FIG. 19. The fiber shell 22', with contained liner 31", is then removed from the press 54" and the intended cover 128 need only be slipped over the drum, as shown in FIG. 21, and secured in place by means of a locking rim assembly 28 (see FIG. 1).

As shown in FIG. 20, the upper lower section 94" will be found with a manifold 96' resulting from the die cavity formed by the upper press face 84" and its mating press face. The air inlet passage 98' communicates with the interior of the liner through the branches of the manifold. The manifold is eventually trimmed and removed to provide the externally threaded filling fitting 127–a and vent fitting 127–b (FIG. 22).

In FIG. 23, I disclose a modification of the plastic lined drum disclosed. A trimmed strip 120' is folded over the chime strip 36', but terminates short of the external groove 74'. A cover 130, having a preformed cover seal 132 on its inner face, is adapted to effectively close the top of the drum. The seal 132, however, includes an integral strip 134 extending downwardly beyond the peripheral edge 136 of the cover 130 so that it may be heat sealed with the adjacent surfaces of the strip 120'. Thus, a further provision for a hermetically sealed plastic liner for a fiber drum is presented and when associated with a locking rim assembly 28 (see FIG. 1), optimum sealing of the top closure of the drum is possible.

It should be understood that I contemplate providing blown thermoplastic liners for drums having other forms of top and bottom closures, as well as cross-sectional shapes. With this in mind, attention is directed to FIGS. 24 and 25 wherein I disclose a fiber drum 140 having an outer shell 142 formed from laminated layers of fibrous material and having transversely convex sides 144 joined together by rounded corners 146. A correspondingly shaped fibrous liner 148 is disposed within the outer shell 142 and extends upwardly beyond the upper edge of the outer shell as shown. The drum 140 incorporates a thermoplastic liner 150 blown into engagement with the inner face of the fibrous liner 148 in accordance with the disclosed teachings of this invention. This plastic liner 150 includes side walls 152 covering substantially the entire inner surfaces of the fibrous liner 148 and also includes an integral base 154 extending laterally across the bottom of the drum. A suitable bottom closure 156 may provide the base of the drum, whereas the top closure 158 includes a downwardly extending apron 160 which is adapted to be telescopically disposed around the exposed sections of the fibrous liner 148. To complete the hermetic liquid seal at the top closure, a sheet of plastic sealing material 162 may be secured to the inner face of the top closure 158 as shown. To secure the top closure 158 to the outer shell 142 after the drum 140 has been filled with the desired liquid or semi-liquid substance, a sealing tape 164 may be placed over the junction of these drum parts. An externally threaded central filling and emptying fitting may be provided on the top closure 158 for receiving a cap. In the event the integral top section of the liner is to be retained, an externally threaded manifold similar to that of FIG. 8 or 20 may be formed thereon to be eventually trimmed to project through an opening in the top closure as a fitting.

Where necessary, a flexible and compressible gasket may be used where plastic elements are not ordinarily heat-sealed together as, for example, at the juncture between liner 120' and seal 134 as shown in FIG. 23. This would also apply in the case of the other embodiments contemplated and disclosed herein.

As will be apparent from the foregoing, a bottom liner section is provided that is not attached to the fiber bottom closure. Accordingly, flexibility of the bottom liner section is provided under shock or impact, especially at the junction of the liner bottom section with the liner sidewalls. On the other hand, when deemed necessary or desirable, an application of adhesive may be interposed between the plastic bottom section and bottom closure to form a unitary bottom construction of far greater strength.

It will thus be seen that the aforenoted objects and advantages are most effectively attained. It will also be realized that, although specific embodiments of our invention have been described and illustrated, various changes therein will become evident to one skilled in the art. Therefore, my invention is to be determined by the scope of the appended claims.

I claim:

1. In the method of manufacturing plastic lined drums the steps of: initially forming a tubular fiber shell having top and bottom open ends; preheating interior surfaces of said shell to a temperature between 110° F. and 150° F.; confining said shell such that a passageway is provided into the shell interior; extruding a tubular plastic parison into said passageway; sealing the parison bottom end and top end while maintaining an air inlet opening exposed to the interior of the parison; introducing air under pressure through said air inlet opening into the interior of said parison to blow the parison outwardly and expand it into engagement with the interior of the shell; and then completing the bottom and top closures selected for said shell.

2. In the method of manufacturing plastic lined drums, the steps of: initially forming a tubular fiber shell having top and bottom open ends; preheating interior surfaces of said shell to a temperature between 110° F. and 150° F.; mounting said shell in an open press with the shell bottom end resting on a shiftable press face such that a passageway is present through the shell top and into the shell interior and out through the shell bottom end; extruding a tubular plastic parison into said passageway to a distance below the shell bottom end; closing said press to confine the side of said shell and, substantially simultaneously, seal the parison bottom end and close its top end with a retained air inlet opening; immediately thereafter actuating the shiftable press face such that it is disposed interiorly at a short distance from the bottom end of the shell; evacuating the press cavity between the press faces and the parison; and, substantially simultaneously therewith, introducing air under pressure through said air inlet opening into the interior of the parison to blow the parison outwardly and expand it into engagement with the interior walls of the shell and shiftable press face while the upper end of said parison is confined by said press; withdrawing the shell and blown parison liner interiorly mounted therein from said press and then completing the selected bottom and top closures for the shell.

3. In the method of manufacturing plastic lined fiber drums, the steps of: initially forming a tubular shell made from laminated layers of fibrous material and having top and bottom open ends; preheating the interior of said shell to a temperature between 110° F. and 150° F. to increase the adhesion between the fibers of the shell and the plastic of the liner; mounting said shell in an open press with the shell bottom end resting on a shiftable press face such that a passageway is present through the shell top end into the shell interior and out through the shell bottom end; extruding a tubular plastic parison into said passageway to a distance below the shell bottom end; closing said press to confine the sides of said shell and, substantially simultaneously, seal the parison bottom and enclose its top end with a retained air inlet opening; immediately thereafter actuating the shiftable press face such that it is disposed inwardly of the shell at a predetermined distance from the bottom end of the shell; substantially simultaneously therewith, introducing air under pressure through said air inlet opening into interior of the parison to blow the parison outwardly and expand it into engagement with the interior walls of the shell and said shiftable press face while the upper end of said parison is confined by said press whereby the plastic of the liner permeates the fibers of the shell; withdrawing the shell and blown parison liner interiorly mounted therein from said press; forming a bottom closure on said shell; and trimming the liner top to cooperate in forming a selected top closure.

4. In the method of manufacturing plastic lined fiber drums, the steps of: initially forming a tubular shell made from laminated layers of fibrous material and having top and bottom ends open, a lower reinforcing metal chime strip disposed around the shell at the bottom end thereof with the shell and lower chime strip being formed into an external groove and an internal shoulder extending completely around the drum a short distance from the lower peripheral edge of the bottom end thereof, an upper reinforcing metal chime strip disposed at the top around the shell and thereof with the shell and upper chime strip being formed into an external groove and an internal shoulder extending completely around the drum a short distance from the upper peripheral edge of the top end thereof; preheating the interior of the shell to a temperature between 110° F. and 150° F. to increase the adhesion between the plastic of the liner and the fibers of the shell; immediately thereafter mounting said shell in an open press such that a passageway with the shell bottom end resting on a shiftable press face is present through the shell top end into the shell interior and out through the shell bottom end; extruding a tubular plastic parison into said passageway to a distance below the shell bottom end; closing said press to confine the sides of said shell and, substantially simultaneously, seal the parison bottom end and close its top end with a retained air inlet opening; immediately thereafter actuating the shiftable press face such that it engages the bottom internal bead of the shell; substantially simultaneously therewith, introducing air under pressure through said air inlet opening into the interior of the parison to blow the parison outwardly and expand it into engagement with the interior walls of the shell and said shiftable press face while the upper end of said parison is confined by said press to cause the plastic of the liner to permeate into the fibers of the shell; withdrawing the shell and blown parison liner interiorly mounted therein from said press; determining the soundness of the top and bottom of the liner; forming a beaded bottom closure; and trimming the liner top to cooperate in forming the selected top closure.

5. The invention in accordance with claim 4 wherein prior to the mounting of the shell in the open press, applying caulking material at the top of the internal shoulder below the upper peripheral edge of the top end of the drum to maintain uniform wall thickness of plastic liner at this location.

6. The invention in accordance with claim 4 wherein the bottom internal bead of the shell and the shiftable press face cooperate in providing the blown liner with a degree of curvature at the junction between the side walls of the liner and its base, and wherein upon withdrawal of the shell and liner from the press, a bottom closure is placed across the bottom end of the shell adjacent the bottom of said liner with surfaces of said bottom closure being provided with a degree of curvature corresponding with the curvature at said junction of said liner for firm interengagement therewith, and the bottom end of the shell is then pressed into a bead embraced by the bottom chime strip with peripheral sections of said bottom closure being anchored in the bead, and with said bottom closure secured to the shell such that the base of the liner together with said junction rests upon the bottom closure.

7. The invention in accordance with claim 4 wherein substantially simultaneously with the blowing and expansion of the parison, evacuating the air between the parison and the interior walls of the shell and press.

8. The invention in accordance with claim 7 wherein the evacuation of the air is through porous surfaces of said shiftable press face.

9. The invention in accordance with claim 4 wherein upon withdrawal of the shell and blown liner from the press, the upper zone of the liner is trimmed at a point spaced from the upper end of the shell, and while the plastic of the strip of liner beyond the upper end of the shell is still warm folding it over the outer face of the upper chime strip, and thereafter permitting this folded over zone of the liner to shrink about the exterior surfaces of the upper chime strip and into its external groove.

References Cited by the Examiner
UNITED STATES PATENTS

| 1,993,751 | 3/1935 | Reid | 93—36.01 |
| 2,546,137 | 3/1951 | Schmidt | 93—36.01 |
| 2,724,672 | 11/1955 | Rubin | 156—322 X |
| 2,727,673 | 12/1955 | Bergstrom | 229—14 |
| 3,126,797 | 3/1964 | Carpenter et al. | 93—26.01 |
| 3,158,311 | 11/1964 | Thompson | 229—14 |
| 3,202,065 | 8/1965 | Bolcato | 93—36 |

BERNARD STICKNEY, Primary Examiner.

DAVID M. BOCKENEK, Examiner.